United States Patent [19]

Eby et al.

[11] Patent Number: 4,533,944
[45] Date of Patent: Aug. 6, 1985

[54] VIDEO MEASUREMENT SYSTEM FOR MICROCOMPUTER

[75] Inventors: John E. Eby, Ipswich; Charles M. Kingston, Georgetown, both of Mass.

[73] Assignee: GTE Products Corporation, Stamford, Conn.

[21] Appl. No.: 548,112

[22] Filed: Nov. 2, 1983

[51] Int. Cl.³ .......................... H04N 7/02; H04N 9/62
[52] U.S. Cl. .................................... 358/107; 358/106; 377/24
[58] Field of Search ................. 358/10, 106, 107, 139, 358/133, 261, 260; 377/19, 24; 382/18, 25

[56] References Cited

U.S. PATENT DOCUMENTS

| | | | |
|---|---|---|---|
| 3,584,143 | 6/1971 | Gold | 358/260 |
| 3,763,357 | 10/1973 | Morton | 358/107 |
| 3,963,866 | 6/1976 | Tanie | 358/107 |

*Primary Examiner*—Tommy P. Chin
*Attorney, Agent, or Firm*—John A. Odozynski; William H. McNeill

[57] ABSTRACT

A video processing system especially for use with microprocessors or microcomputers characterized by limited memory storage capacity and processing capability. The video processing system includes a TRANSITION DETECTOR for detecting BLACK-TO-WHITE and WHITE-TO-BLACK transitions in a video signal, from whatever source. The output of the TRANSITION DETECTOR is coupled to a FEATURE COUNTER so that the FEATURE COUNTER provides at a computer buss an output indicative of the number of such transitions occurring during a particular horizontal scanning period. An output of the FEATURE COUNTER drives a DECODER that selectively enables a plurality of FEATURE TIMERS, each of which has an input coupled to a CLOCK so that the FEATURE TIMERS provide an output indicative of the time duration between successive transitions in the video signal. The video processing system thereby makes available to the microcomputer the number and respective durations of transitions during a horizontal scanning period. At the end of each horizontal line, this data is transferred via the computer buss into memory and the FEATURE COUNTER and FEATURE TIMERS are reset in preparation for the subsequent line. This cycle is repeated until an entire video frame has been encoded and transferred to the microcomputer for processing as desired.

2 Claims, 2 Drawing Figures

VIDEO MEASUREMENT SYSTEM FOR MICROCOMPUTER

FIELD OF THE INVENTION

The invention relates to video processing systems and, more particularly, to the digital encoding of a video signal in a manner rendering the signal amenable to transfer to and processing by a computing machine.

BACKGROUND OF THE INVENTION

Heretofore video processing systems for quantizing, encoding and otherwise preconditioning video signals, from whatever source, prior to transfer to and manipulation by digital computers have predominantly been of the genre classifiable as "frame grabbers". The operation of a frame grabber is such that each horizontal line is scanned by, for example, a video camera or similar transducer and analytically subdivided into, typically, several hundred picture elements, the picture elements commonly referred to as "pixels". The average brightness level of each pixel is represented by an analog voltage which is in turn quantized by an analog-to-digital converter (A/D) so as to render the gray scale level, a measure of the proportional brightness of that pixel, amenable to storage and processing via a computer.

Although offering a substantial amount of quantitive information regarding the image scanned by the video camera, the frame grabbing technique suffers as an inherently slow and expensive approach to video data acquistion. The drawback is largely attributable to the requirement to process approximately $10^5$ pixels per frame of video information. Relatively sophisticated and commensurately expensive hardware is required to digitally encode the analog signal representing the brightness level of each pixel and thereafter transfer into memory the information so encoded. Furthermore, the technique necessitates the use of a relatively powerful, in terms of both storage as well as a computational capacity, computer in order to process the video data so acquired in anything approaching real time applications.

The video processing system contemplated by the subject invention represents a substantially simplified approach to video data acquisition and, although not generally capable of delivering quite the level of quantitive information as the frame grabber described above, has proved entirely adequate in a broad range of applications involving dimensional measurements. For example, the invention has proved quite useful in measuring the inside and outside diameters of quartz tubes in a production process.

Furthermore, the invention requires a modest amount of relatively less sophisticated circuitry in order to implement the interface of the video transducer (e.g., camera) to a computer. Furthermore, because the memory and computational demands are relaxed, it has been found possible to use relatively inexpensive microprocessors in real time measurement and control applications otherwise requiring more sophisticated computers.

DISCLOSURE OF THE INVENTION

The above and other objects, advantages and capabilities are achieved in one aspect of the invention by a video measurement system especially suited for use with a microcomputer or microprocessor. The measurement system quantizes video information developed by, for example, a camera and presents the quantized information in a form amenable to transfer to and manipulation by the microprocessor.

The system includes a transition detector that indicates the occurrence WHITE-TO-BLACK and BLACK-TO-WHITE transitions in a video image as the image is horizontally scanned. The number of picture elements between transitions is counted by a feature counter and made available to the microprocessor via a multiplexer/buss. A decoder driven by the feature counter selectively enables a series of feature timers. The feature timers are used to measure the respective time intervals between transitions and, therefore, the linear dimension of the features.

DETAILED DESCRIPTION OF THE INVENTION

Figure 1:
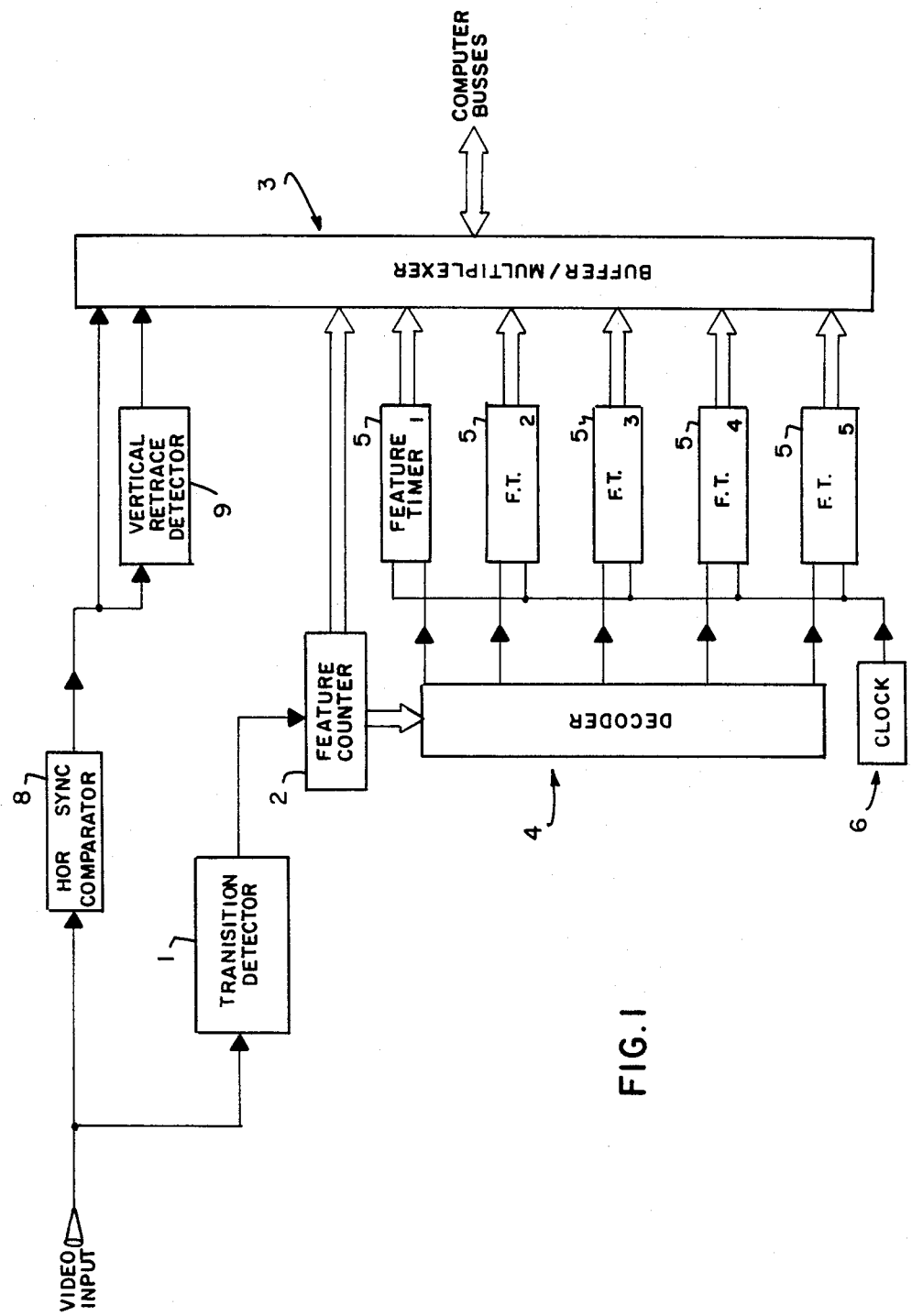
FIG. 1 is a block diagram of the video measurement system.

Referring now to FIG. 1, circuitry contemplated by the subject invention includes a transition detector that can be generally understood to operate so as to quantize a video image into two levels WHITE or BLACK, and to detect and indicate the occurrence of BLACK-TO-WHITE and WHITE-TO-BLACK transitions in the image. The operation of the transition detector will be described in detail below. For now let it suffice to note that the transition detector has an input adapted to be coupled to a source of video information, e.g., a camera. The transition detector produces at its output a pulse upon the occurrence of each transition in the video input as the image is repeatedly scanned in the horizontal direction.

The pulses at the output of the transition detector are accummulated in a feature counter 2. The feature counter has a first output coupled through a buffer/multiplexer 3 to a microcomputer buss. This output is a measure of the running total of transitions that have occurred during a particular horizontal scanning period. A second output of the feature counter is coupled to an input of a decoder 4.

In particular, the decoder is a ONE-OF-N decoder having N available outputs. For, example, assuming that the feature counter is a four-bit binary counter, then the decoder would appropriately be a ONE-OF-SIXTEEN decoder so that a specified logic level, e.g., a logic level ONE, appears at one of its sixteen possible outputs in response to one of the sixteen possible output states of the feature counter. The logic level can serve to ENABLE one of a total of sixteen possible feature timers 5. Each of the feature timers, five are shown in FIG. 1, may assume the form of a binary counter having an ENABLE input coupled to a decoder output and a CLOCK input coupled to a clock 6.

Operation of the feature counter is as follows. As each transition in the video image occurs, the feature counter changes state so that an ENABLE signal appears at successive outputs of the decoder. The N decoder outputs may be hardwired to the ENABLE inputs of N feature timers, alternatively, selected decoder outputs of the decoder may be wired to M, where M is less than N, respective selected feature timers. In this manner the video processing system will operate so as to perform measurements on only M features.

A typical measurement envisioned by the invention is a linear dimension of an object scanned by the camera. The clock provides a constant-frequency, periodic signal to each timer. The timers are in turn enabled, and therefore count, for a length of time corresponding to the specific feature scanned. As a result, the individual feature timers provide an output to the microprocessor, through the buffer/multiplexer, corresponding to the linear dimension of the feature selected. For example, in a specific embodiment, the video processing system is used to measure the inner diameter and the outer diameter of the end of a quartz tube.

Figure 2:
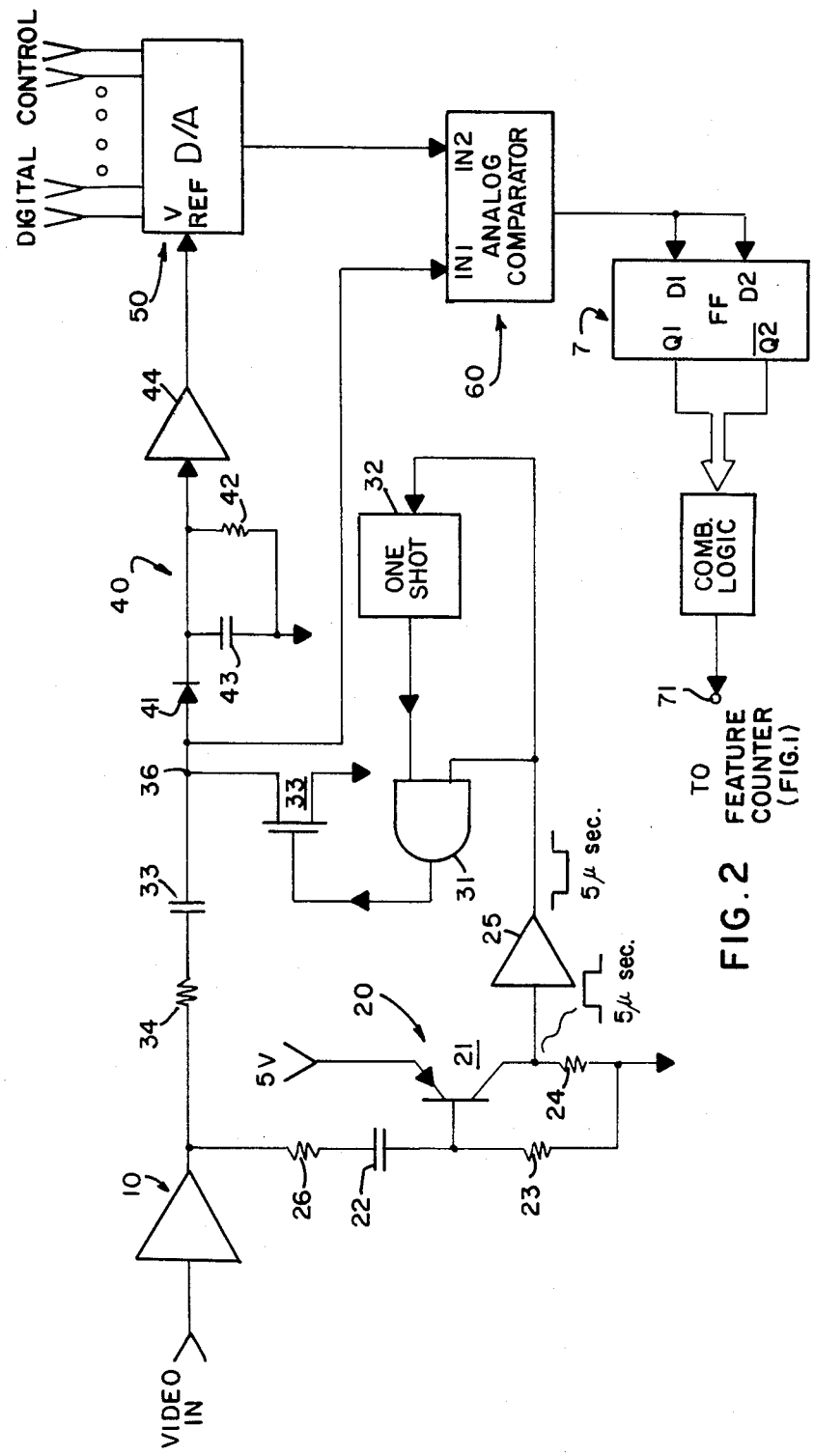
FIG. 2 is a detailed representation of the transition detector.

An essential component of the video measurement system is the transition detector, illustrated in detail in FIG. 2. The transition detector includes a buffer amplifier 10 having an input adapted to be coupled to the source of video information, e.g., camera. The output of buffer 10 is coupled to a pulse generator 20.

The pulse generator includes an NPN transistor 21 having a base coupled through resistor 26 and capacitor 22 to the output of buffer amplifier 10 and coupled through a resistor 23 to circuit ground. The emitter of transistor 21 is coupled to a 5-volt supply, while its collector is coupled to ground through resistor 24. The output of amplifier 10 is AC-coupled, roughly differentiated, so that Q1 is rendered conductive only during the occurrence of negative-going, horizontal sync pulses in the composite video signal. The pulse generator provides a 5 usecond, positive-going STROBE pulse at the collector of transistor 21.

The STROBE pulse is applied to an inverter 25 and a $\overline{\text{STROBE}}$ pulse applied to one input of AND gate 31. AND gate 31 may be viewed as one element of a clamping circuit 3 that also includes a ONE-SHOT 32 and FET 33. The $\overline{\text{STROBE}}$ pulse is applied to and triggers the ONE-SHOT so that a 9 usecond pulse is developed at the other input of AND gate 31. The leading edge of the pulse provided by the ONE-SHOT roughly coincides with the leading edge of the $\overline{\text{STROBE}}$ pulse. The output of the AND gate is therefore a CLAMP pulse roughly coincident with the "front porch" following the horizontal sync pulse. The CLAMP pulse is applied to the gate of FET 33 having a drain coupled through a resistor 34 and capacitor 35 to the output of buffer amplifier 10. The source of FET 33 is connected to circuit ground. As a result the signal at terminal 36 is a composite video signal having the horizontal "front porch" clamped to ground. The clamping action removes any drift in the DC level of the composite video signal.

The clamped composite video signal at terminal 36 is coupled to a peak detector 4 and one input of a comparator 6.

The peak detector includes a diode 41 having an anode coupled to terminal 36 and a cathode coupled to a long time-constant, RC network including a parallel-connected resistor 42 and capacitor 43. As a result the signal at the input to buffer amplifier 44 approximates a DC voltage corresponding to (actually one diode drop less than) the peak WHITE level in the video image. The output of buffer amplifier 44 is coupled to the REFERENCE input of a Digital-to-Analog Converter (D/A) 5.

The D/A operates, under control of the microprocessor, as a multiplier so that the voltage at its output is a predetermined percentage of the voltage applied at its REFERENCE input, that is, a predetermined fraction of the peak WHITE level in the video image. This voltage is applied to one input of a comparator 6, the comparator having the clamped video signal applied to its other input. The operation of the comparator is such that it provides a logic level ONE at its output when the clamped video signal is greater than the percentage reference and a logic level ZERO when it is less than the percentage reference. The comparator output is applied to both inputs of a dual D-type flip-flop 7 and the outputs of the flip-flop combines so that a pulse appears at terminal 71 each time a BLACK-TO-WHITE or WHITE-TO-BLACK transition occurs.

As shown in FIG. 1, the horizontal sync and vertical retrace signals are extracted from the composite video signal by a horizontal sync separator and a vertical retrace detector 9 respectively. These signals are used to control the transfer of information to the microprocessor, via buffer/multiplexer 3, in the following manner. Upon the occurrence of a horizontal sync pulse, data derived during the immediately preceeding horizontal scanning period, as represented by the contents of the feature counter and feature timers, is transferred to the buffer/multiplexer. These devices are then concomitantly reset in anticipation of the next horizontal scanning sequence. The vertical retrace signals are used to indicate that data corresponding to a complete frame has been acquired, typically requiring approximately two hundred and fifty horizontal scans. In a video measurement system such as configured in FIG. 1, each horizontal scanning sequence requires the transfer of six words of words of data into the microprocessor memory, for a maximum data acquisition of fifteen hundred words per frame. This compares extremely favorably with the fifty to one hundred thousand words required by "frame grabbers" alluded to above.

To reiterate what has been described above, the subject video measurement system is unique in that it quantifies the video information into two pixel levels: BLACK and WHITE, a WHITE level being defined as any brightness level above a predetermined percentage of the peak brightness level and a BLACK level being defined as any level below the predetermined percentage. As each horizontal line is scanned B/W and W/B transitions are detected and counted. The system measures the total number of transitions in a scanning period and measures the time duration between transitions. Features, defined as individual pixel elements between transitions, can then be measured according to their time duration. Because the horizontal scanning period is known, the duration of each pixel can be converted to a dimensional length. The analysis of data so acquired and stored takes place under program control as established by the particular application to which the measurement system is addressed.

This system provides a much simplified form of data acquisition which, while providing limited information, is nevertheless completely adequate for a large set of dimensional measurement applications. In addition to employing much less complex hardware for the interface to the computer, the data processing load is sufficiently attenuated to allow an inexpensive microprocessor to be used in real time measurement and control applications.

Accordingly while there has been disclosed and described what at present is deemed to be a preferred video measurement system, it will be obvious to those having ordinary skill in the art that various changes and modifications may be made therein without departing from the scope of the invention as defined by the appended claims.

INDUSTRIAL APPLICABILITY

The subject invention is useful in video measurement applications and is particularly suited to programmed dimensional analysis.

What is claimed is:

1. A video measurement system for coupling between a source of video signal and a computer buss and for quantizing information contained in a video signal and conditioning that information for a memory device such as might be comprised by a microcomputer, said system comprising:

a transition detector having an input for coupling to said source of video signal, said transition detector providing at its output a signal indicative of Black-to-White and White-to-Black transitions in the peak brightness level of the video signal, a feature counter having an input coupled to the output of the transition detector and an output for coupling to the computer buss, said feature counter providing at an other output a signal representative of the number of Black-to-White and White-to-Black transitions in the video signal, a decoder having an input coupled to an output said other of the feature counter and at least N individual outputs, N individual feature timers, each having an ENABLE input coupled to a decoder output and an output for coupling to the computer buss, and a clock having an output coupled to a CLOCK input of each of the feature timers, whereby the decoder operates in response to said output of the feature counter to selectively enable individual ones of the feature timers as determined by the transitions in the video signal so that the feature timers provide outputs representative of the duration between transitions in the video signal.

2. A video measurement system as defined in claim 1 wherein the transition detector comprises:

first means for clamping the video signal, for determining the peak amplitude of the video signal, and for developing a reference signal related thereto, multiplying means coupled to the first means for developing a threshold signal equivalent to a predetermined percentage of the reference signal, a comparator having a first input for coupling to the video signal and a second input coupled to the multiplying means, said comparator providing its output a signal indicative of the relative amplitudes of the video signal the threshold signal, and a transition pulser having an input coupled to the output of the comparator for providing transition pulses at its output each time the amplitude of the video signal becomes greater than or less than the amplitude of the threshold signal, and means for coupling said transition pulses to said feature counter for processing.

* * * * *